Oct. 30, 1951 R. A. GULL 2,572,926

PRESETTABLE SIGNAL SEEKING TUNING SYSTEM

Filed Nov. 14, 1947

INVENTOR
Roy A. Gull
BY C. A. Norton
ATTORNEY

Patented Oct. 30, 1951 2,572,926

UNITED STATES PATENT OFFICE 2,572,926

PRESETTABLE SIGNAL SEEKING TUNING SYSTEM

Roy A. Gull, Buffalo, N. Y., assignor, by mesne assignments, to Sylvania Electric Products Inc., New York, N. Y., a corporation of Massachusetts Application November 14, 1947, Serial No. 785,993

3 Claims. (Cl. 250—20)

Figures 1, 2:
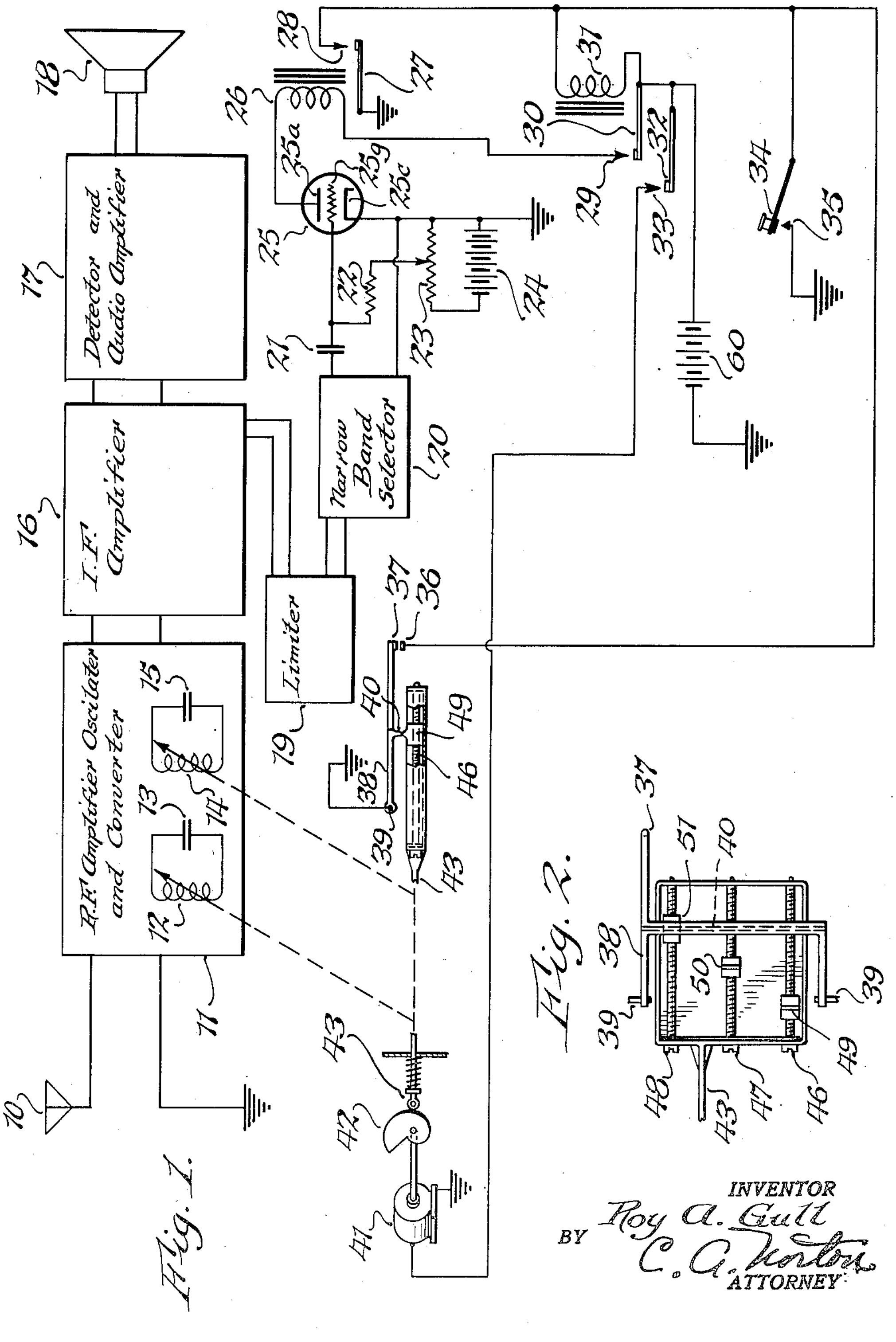

This invention relates to improvements in so-called signal seeking receivers. In receivers of this type, as is well known, the tuning element is motor driven and scans the receiver spectrum repeatedly. When a signal of predetermined strength is received, the incoming signal itself actuates mechanism to shut off the motor drive, thus leaving the receiver tuned to the incoming signal. Under favorable conditions, a very large number of stations may be received, which means that the listener may have difficulty in quickly finding the particular station to which he wishes to listen.

Suppose for example, that the listener desires to have the receiver stop tuning only on local stations and not to stop on distant stations, the signals from which may be weaker and more subject to noise.

In the past, this has been accomplished by adjusting the sensitivity of the control tube which opens the motor circuit when a signal of predetermined strength is received but this is not altogether satisfactory, particularly when the receiver is mounted in an automobile, because the signal strength may vary from time to time and as the car moves about.

It is an object of this invention to overcome this difficulty and to provide a signal seeking receiver in which the user may make a previous selection and calibrate the receiver to respond only to desired stations.

It is a further object of this invention to provide such a receiver in which the additional apparatus required to give the user this pre-selecting ability is relatively simple and inexpensive and introduces substantially no complications in the receiver.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which Figure 1 is a schematic circuit diagram of a signal seeking receiver in accordance with my invention, Figure 2 is a plan view of the apparatus utilized for pre-setting the receiver to the desired stations.

Referring now more particularly to Figure 1 of the drawing, 10 designates the antenna of any suitable type, feeding radio frequency amplifier, oscillator and converter unit 11, containing the tuned circuits, inductance 12 and condenser 13, and inductance 14 and condenser 15. Additional tuned circuits may be employed which, for the sake of simplicity, are not shown.

Tuning of these circuits may be by means of variable condensers or, preferably in the case of an automobile receiver, by permeability cores movable within the field of inductances 12 and 14. The intermediate frequency output from the amplifier, oscillator and converter unit 11 is supplied to the intermediate frequency amplifier 16 of usual construction and the output from this is supplied to detector and audio-amplifier unit 17, thence to loud speaker 18.

In order to provide the signal seeking action of the receiver, a part of the output of intermediate frequency amplifier 16 is supplied to limiter 19, which may be of usual construction and may include a vacuum tube so arranged that the output can never exceed a certain level no matter how great the input. The output of the limiter 19 may then be supplied to narrow band selector 20 which may be of any suitable type for example, a crystal bridge circuit. The admittance band of the band selector 20 is preferably of the order of about $\frac{1}{10}$ of the preceding circuits, that is, the circuits preceding the limiter. If the intermediate frequency amplifier is arranged to pass a band width of 5000 cycles, the narrow band selector 20 will be arranged to pass a band width of approximately 500 cycles or less.

The effect of this is to render the receiver relatively insensitive to noise; that is to say, noise pulses will not cause the receiver to stop scanning, in the absence of a signal.

This particular feature is not, per se, a part of this invention, but is included merely for the purpose of completing the disclosure herein. The invention of this feature is described and claimed in the co-pending application of Verlis H. Wiley, Serial No. 554,470, now United States Letters Patent No. 2,491,942, granted December 20, 1949.

The output of the narrow band selector 20 is passed through blocking condenser 21 to the input circuit of tube 25. Tube 25 may be, for example, a triode having cathode 25c, control electrode 25g, and anode 25a. The control electrode 25g may be connected through resistor 22 from the output terminal of condenser 21 to the tap of potentiometer 23 energized by battery 24 and connected to the lead from cathode 25c to ground.

The output of tube 25 includes the actuating winding of sensitive relay 26, thence to fixed contact 29 of lock-in relay 31, thence through armature contact 30 when relay 31 is closed and thence through battery 60 to ground. Armature 27 of relay 26 may be connected to ground and when in contact with fixed contact 28, is connected through energizing coil of lock-in relay 31 and battery 60 to ground. Also from the energizing coil of relay 31 there is provided a manual starting switch having movable contact 34 and fixed contact 35, the latter being connected to the ground.

Connected to armature contact 30, there is provided an additional armature contact 32 which engages fixed contact 33 connected through motor 41 to ground. Motor 41 drives the tuner of the RF amplifier oscillator and converter unit 11 through any suitable mechanism, herein shown and described as cam 42 driving follower 43 which, in turn, moves the permeability cores or the variable condensers, and also the pre-setting mechanism which will now be described.

From movable switch contact 34, there is provided a connection to fixed contact 36 which is engaged by movable contact 37 carried on a bail bar 38, pivoted at 39. The bail bar is also provided with a cam follower 40, as will be more particularly apparent from Figure 2. Bail bar 38 is moved by the traveling cams 49, 50, and 51, each of which is mounted on adjusting screws 46, 47, and 48 respectively, driven by cam 42 and synchronized with the tuner carriage 43. Each of these cams 49, 50, and 51, carries a small raised portion adjacent to the center, as shown in Figure 2, so that upon passage of any cam under the cam follower 40, the bail bar will be slightly lifted and contacts 37 and 36 opened. The proportions of the cams 49, 50 and 51 and the cam follower 40 are preferably so chosen that the contacts 36 and 37 are open over a range not exceeding 10 kilocycles.

The operation of the receiver will now be described. Assuming that the receiver has been turned on, the tubes have warmed up, and the operator wishes to tune to a station, he will momentarily close switch contact 34 against fixed contact 35. This completes a circuit from ground through battery 60, energizing coil of lock-in relay 31, switch contacts 34 and 35 back to ground, closing the lock-in relay 31. Closure of lock-in relay 31 closes armature contact 32 against fixed contact 33, energizing the motor circuit from battery 60, the motor 41 will begin to operate, and the tuner will begin to scan. When a signal of predetermined strength is tuned in, the output of the narrow band selector 20 which is rectified and applied to the tube 25, in a manner to make the grid more negative with respect to the cathode, biases the tube to cut off or sufficiently near thereto to permit the sensitive relay 26 to open.

If it were not for the provision of the pre-settable apparatus, the opening of the sensitive relay 26 wound interrupt the energizing current of lock-in relay 31 and permit it to open, thereby opening the motor circuit and stopping the scanning at that point. However, it will be observed that the provision of this pre-settable apparatus provides an alternative circuit for energizing the lock-in relay 31 so that, as long as contacts 36 and 37 are closed, the lock-in relay is held in and the motor circuit is held closed regardless of the position of relay 26. The function of contacts 36 and 37 is, therefore, to render the motor circuit independent of the operation of the relay 26 except over such small segments of the scanning spectrum as may be set up by the cams 49, 50, and 51 which open contacts 36 and 37.

To make this more clear, consider that the cam carriage is at one end of its travel and for purposes of clarity this may be assumed to be when the cam follower 40 is at the left hand side of the cam carriage in Figure 2. As the cam carriage moves to the left, cam 49 will approach cam follower 40 and when it comes directly under the cam follower 40, will lift the bail bar 38 and open contacts 36 and 37. As soon as it passes this point the cam follower 40 rides down and permits contacts 37 and 36 to close. They will remain closed until cam 50 engages cam follower 40 at which time the contacts will again be opened while cam 50 is passing under the follower 40. After the passage of cam 50, the contacts 36 and 37 will again be closed until cam 51 engages follower 40, thereby opening contacts 37 and 36 while cam 51 passes under the cam follower 40. After the cam 51 has passed under the cam follower 40, the contacts will again close and will remain closed until the cam carriage reaches the end of its travel and is returned to begin the tuning cycle again.

In order to calibrate or pre-set the apparatus, the user first manually tunes the desired station. He will then adjust one of the cam screws 46, 47, or 48 until the corresponding cam is directly centered under the cam follower 40. This adjustment should be such that contacts 37 and 36 will be open over a range of a little less than 10,000 cycles scanning range and preferably a little less than 5,000 cycles on each side of the correct tuning position for the station. Similar adjustment may be made for other stations with the other cam screws not previously adjusted.

In the arrangement herein shown I have indicated only three cams, this providing, of course, for the pre-setting of three stations. However, it will be understood that as many cams may be provided as desired so that the user may pre-set a receiver for any particular number of stations which he wishes to receive. Thus it will be seen that although the sensitive relay 26 may open at any point in the travel of the scanning process, the lock-in relay 31 will be held in and the motor circuit will be kept closed except in the immediate vicinity of the position for tuning stations which have already been set up on the cams.

In the specification I have explained the principles of my invention and the best mode in which I have contemplated applying those principles, so as to distinguish my invention from other inventions, and I have particularly pointed out and distinctly claimed the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

I claim:

1. An automatic tuning system comprising: variable tuning means for tuning a radio apparatus to any frequency within a predetermined operating frequency range; power-operated means energizable to vary said tuning means continuously and repeatedly over said tuning range; a control system responsive to a predetermined amplitude of signal energy developed in a resonant circuit of said apparatus for de-energizing said power-operated means to terminate variation thereby of said tuning means; and an auxiliary control system including a longitudinally movable and longitudinally adjustable element actuated, in synchronized relation with the movement of said tuning means, over a range of movement; said auxiliary control system also including means for energizing said power-operated means independently of said first-mentioned control system except over a small portion of the range of movement of said element which small portion is established by the longitudinal adjustment of said element and corresponds to an adjustment of said tuning means in proximity to a preselected operating frequency.

2. An automatic tuning system comprising: variable tuning means for tuning a radio apparatus to any frequency within a predetermined operating frequency range; power-operated means energizable to vary said tuning means continuously and repeatedly over said tuning range; a control system responsive to a predetermined amplitude of signal energy developed in a resonant circuit of said apparatus for de-energizing said power-operated means to terminate variation thereby of said tuning means; and an auxiliary control system including a plurality of elements individually adjustable longitudinally and simultaneously movable longitudinally, in synchronized relation with the movement of said tuning means, over a range of movement; said auxiliary control system also including means for energizing said power-operated means independently of said first-mentioned control system except over a small portion of the range of movement of each of said elements which small portion is established by the longitudinal adjustment of said each element and corresponds to an individual adjustment of said tuning means in proximity to a preselected operating frequency.

3. An automatic tuning system comprising: variable tuning means for tuning a radio apparatus to any frequency within a predetermined operating frequency range; power-operated means energizable to vary said tuning means continuously and repeatedly over said tuning range; a control system responsive to a predetermined amplitude of signal energy developed in a resonant circuit of said apparatus for de-energizing said power-operated means to terminate variation thereby of said tuning means; and an auxiliary control system including a plurality of cams individually adjustable longitudinally and simultaneously movable longitudinally, in synchronized relation with the movement of said tuning means, over a range of cam movement; said auxiliary control system also including a switch actuated by a plurality of cam follower elements, said switch being included in a circuit for energizing said power-operated means independently of said first-mentioned control system except over a small portion of the range of movement of each of said cams which small portion is established by the longitudinal adjustment of said each cam and corresponds to an individual adjustment of said tuning means in proximity to a preselected operating frequency.

ROY A. GULL.

REFERENCES CITED

The following references are of record in the file of this patent:

UNITED STATES PATENTS

| Number | Name | Date |
|---|---|---|
| 1,700,282 | Burns et al. | Jan. 29, 1929 |
| 2,052,708 | Hammond | Sept. 1, 1936 |
| 2,231,806 | Goldsborough | Feb. 11, 1941 |
| 2,453,252 | Newman | Nov. 9, 1948 |